US009152881B2

(12) United States Patent
Brumby et al.

(10) Patent No.: US 9,152,881 B2
(45) Date of Patent: Oct. 6, 2015

(54) IMAGE FUSION USING SPARSE OVERCOMPLETE FEATURE DICTIONARIES

(71) Applicant: Los Alamos National Security, LLC, Los Alamos, NM (US)

(72) Inventors: Steven P. Brumby, Santa Fe, NM (US); Luis Bettencourt, Los Alamos, NM (US); Garrett T. Kenyon, Santa Fe, NM (US); Rick Chartrand, Los Alamos, NM (US); Brendt Wohlberg, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 106 days.

(21) Appl. No.: 14/026,295

(22) Filed: Sep. 13, 2013

(65) Prior Publication Data
US 2014/0072209 A1    Mar. 13, 2014

Related U.S. Application Data

(60) Provisional application No. 61/700,748, filed on Sep. 13, 2012, provisional application No. 61/700,757, filed on Sep. 13, 2012.

(51) Int. Cl.
*G06K 9/62* (2006.01)
*G06K 9/46* (2006.01)

(52) U.S. Cl.
CPC ............ *G06K 9/6221* (2013.01); *G06K 9/6244* (2013.01); *G06K 2009/4695* (2013.01)

(58) Field of Classification Search
None
See application file for complete search history.

(56) References Cited

U.S. PATENT DOCUMENTS

| 6,100,899 | A   | 8/2000  | Ameline et al. |
|-----------|-----|---------|----------------|
| 7,058,128 | B1  | 6/2006  | Itokawa |
| 7,542,959 | B2  | 6/2009  | Barnhill et al. |
| 7,734,097 | B1  | 6/2010  | Porikli et al. |
| 8,768,048 | B1  | 7/2014  | Kwatra et al. |
| 2004/0161133 | A1 | 8/2004 | Elazar et al. |
| 2004/0252882 | A1 | 12/2004 | Krumm et al. |
| 2007/0098222 | A1 | 5/2007 | Porter et al. |
| 2008/0170623 | A1* | 7/2008 | Aharon et al. ........... 375/240.22 |
| 2010/0040296 | A1* | 2/2010 | Ma et al. ....................... 382/225 |

(Continued)

OTHER PUBLICATIONS

A.M. Waxman, J.G. Verly, D.A. Fay, F. Liu, M.I. Braun, B. Pugliese, W. Ross, and W. Streilein, "A prototype system for 3D color fusion and mining of multisensor/spectral imagery", 4th International Conference on Information Fusion, Montreal, 2001.

(Continued)

*Primary Examiner* — Nirav G Patel
*Assistant Examiner* — Ian Lemieux
(74) *Attorney, Agent, or Firm* — LeonardPatel PC

(57) ABSTRACT

Approaches for deciding what individuals in a population of visual system "neurons" are looking for using sparse overcomplete feature dictionaries are provided. A sparse overcomplete feature dictionary may be learned for an image dataset and a local sparse representation of the image dataset may be built using the learned feature dictionary. A local maximum pooling operation may be applied on the local sparse representation to produce a translation-tolerant representation of the image dataset. An object may then be classified and/or clustered within the translation-tolerant representation of the image dataset using a supervised classification algorithm and/or an unsupervised clustering algorithm.

18 Claims, 14 Drawing Sheets

(56) References Cited

U.S. PATENT DOCUMENTS

| | | | |
|---|---|---|---|
| 2010/0128942 A1 | 5/2010 | Licato et al. | |
| 2011/0064302 A1* | 3/2011 | Ma et al. | 382/159 |
| 2011/0075920 A1 | 3/2011 | Wu et al. | |
| 2011/0075938 A1 | 3/2011 | Singhal | |
| 2011/0188757 A1* | 8/2011 | Chan et al. | 382/190 |
| 2011/0243434 A1 | 10/2011 | Cao | |
| 2012/0269436 A1 | 10/2012 | Mensink et al. | |

OTHER PUBLICATIONS

Brophy, A. L. "Alternatives to a table of criterion values in signal detection theory". Behavior Research Methods, Instruments, & Computers, 18, 285-286 (1986).

C. Cortes & V. Vapnik, "Support—Vector Networks", Machine Learning, 20, 273-297 (1995).

Carpenter, G. A., Gjaja, M. N., Gopal, S., & Woodcock, C. E. "ART neural networks for remote sensing: vegetation classification from Landsat TM and terrain data". IEEE Transactions on Geoscience and Remote Sensing, 35, 308-325 (1997).

Chang, C.C. and C.J. Lin. "LIBSVM—A Library for Support Vector Machines," (2001). Available: http://www.csie.ntu.edu.tw/~cjlin/libsvm.

D. G. Lowe, "Object recognition from local scale-invariant features," Proceedings of the International Conference on Computer Vision, 1999.

D. L. Donoho and M. Elad, "Optimally sparse representation in general (nonorthogonal) dictionaries via L1 minimization", Proc. National Academy of Sciences, 100, pp. 2197-2202 (2003).

Daniela I. Moody, Steven P. Brumby, Kary L. Myers, Norma H. Pawley, "Classification of transient signals using sparse representations over adaptive dictionaries", Proceeding of SPIE vol. 8058, Orlando, FL, Apr. 25-29, 2011.

Hebb, D.O., "The organization of behavior", New York: Wiley, 1949.

Hubei, D.H., Wiesel, T.N. "Receptive fields and functional architecture of monkey striate cortex". J. Physiol. (Lond.) 195, 215-243 (1968).

J. Mairal, F. Bach, and J. Ponce, "Task-driven dictionary learning," preprint, 2010. Printed in IEEE Transactions on Pattern Analysis and Machine Intelligence, vol. 34, No. 4, Apr. 2012.

J. Mairal, M. Elad and G. Sapiro. "Sparse representation for color image restoration". IEEE Transactions on Image Processing. vol. 17, issue 1, pp. 53-69 (Jan. 2008).

K. Fukushima, "Neocognitron: A self-organizing neural network model for a mechanism of pattern recognition unaffected by shift in position", Biological Cybernetics, 36(4), pp. 193-202 (Apr. 1980).

L. Itti, C. Koch, E. Niebur, "A Model of Saliency-Based Visual Attention for Rapid Scene Analysis", IEEE Transactions on Pattern Analysis and Machine Intelligence, vol. 20, No. 11, pp. 1254-1259 (Nov. 1998).

M. Chiarella, D. Fay, R. Ivey, N. Bomberger, A. Waxman, "Multisensor image fusion, mining, and reasoning: Rule sets for higher-level AFE in a COTS environment", Proceedings of the 7th International Conference on Information Fusion, Stockholm, Sweden, pp. 983-990 (Jun. 2004).

Masquelier T, Serre T, Thorpe SJ and Poggio T., "Learning complex cell invariance from natural videos: a plausibility proof." CBCL Paper #269/MIT-CSAIL-TR #2007-060, MIT, Cambridge, MA, 2007.

Oja, Erkki, "A simplified neuron model as a principal component analyzer", Journal of Mathematical Biology 15 (3): 267-273 (Nov. 1982).

Olshausen, B. A. and Field, D. J., "Emergence of simple-cell receptive field properties by learning a sparse code for natural images". Nature, 381:607-609 (1996).

Paul Henning and Andrew White, "Trailblazing with Roadrunner", Computing in Science & Engineering, pp. 91-95 (Jul./Aug. 2009).

R. DeValois, D. Albrecht, and L. Thorell, "Spatial Frequency Selectivity of Cells in Macaque Visual Cortex", Vision Research, vol. 22, pp. 545-559 (1982).

R. DeValois, E. Yund, and N. Hepler, "The Orientation and Direction Selectivity of Cells in Macaque Visual Cortex", Vision Research, vol. 22, pp. 531-544 (1982).

Riesenhuber, M. & Poggio, T. "Hierarchical Models of Object Recognition in Cortex", Nature Neuroscience 2:1019-1025 (1999).

S. G. Mallat and Z. Zhang, "Matching Pursuits with Time-Frequency Dictionaries", IEEE Transactions on Signal Processing, pp. 3397-3415 (Dec. 1993).

Steven Brumby, Luis Bettencourt, Michael Ham, Ryan Bennett, and Garrett Kenyon, "Quantifying the difficulty of object recognition tasks via scaling of accuracy versus training set size", Computational and Systems Neuroscience (COSYNE) 2010, Salt Lake City, Utah, Feb. 25-28, 2010.

Steven Brumby, Michael Ham, Will A. Landecker, Garrett Kenyon, Luis Bettencourt, "Visualizing classification of natural video sequences using sparse, hierarchical models of cortex", Computational and Systems Neuroscience (COSYNE) 2011, Salt Lake City, Utah, Feb. 24-27, 2011. [Nature Precedings, npre.2011.5971.1].

Steven P. Brumby, Amy E. Galbraith, Michael Ham, Garrett Kenyon, and John S. George, "Visual Cortex on a Chip: Large-scale, real-time functional models of mammalian visual cortex on a GPGPU", GPU Technology Conference (GTC) 2010, San Jose, CA, Sep. 20-23, 2010.

Steven P. Brumby, Garrett Kenyon, Will Landecker, Craig Rasmussen, Sriram Swaminarayan, and Luis M. A. Bettencourt, "Large-scale functional models of visual cortex for remote sensing", 38th IEEE Applied Imagery Pattern Recognition, Vision: Humans, Animals, and Machines, Cosmos Club, Washington DC Oct. 14-16, 2009.

T. Serre, A. Oliva and T. Poggio. "A feedforward architecture accounts for rapid categorization". Proceedings of the National Academy of Science, 104(15), pp. 6424-6429 (Apr. 2007).

T. Serre, L. Wolf, S. Bileschi, M. Riesenhuber and T. Poggio. "Object recognition with cortex-like mechanisms". IEEE Transactions on Pattern Analysis and Machine Intelligence, 29(3), pp. 411-426 (2007).

USGS Hyperion Sensors Site, http://eo1.usgs.gov/sensors/hyperion, last modified Dec. 13, 2011 (last accessed Jan. 24, 2014).

First set of IEEE Xplore search results in U.S. Appl. No. 14,026,812 from http://ieeexplore.ieee.org/search/searchresult.jsp on Jan. 12, 2015 (complete query string not visible).

Ian L. Lemieux, "Non-Final Office Action", issued on Feb. 25, 2015 for U.S. Appl. No. 14/026,730.

Non-final Office Action issued in U.S. Appl. No. 14/026,812 on Jan. 12, 2015.

Second set of IEEE Xplore search results in U.S. Appl. No. 14/026,812 from http://ieeexplore.ieee.org/search/searchresult.jsp on Jan. 12, 2015 (complete query string not visible).

W.S. Geisler, J.S. Perry "Contour statistics in natural images: grouping across occlusions" Vis. Neurosci., 26 (1), pp. 109-121 (2009).

Notice of Allowance issued in U.S. Appl. No. 14/026,812 on May 29, 2015.

* cited by examiner

IMAGE FUSION USING SPARSE OVERCOMPLETE FEATURE DICTIONARIES

CROSS REFERENCE TO RELATED APPLICATIONS

This application claims the benefit of U.S. Provisional Application Ser. Nos. 61/700,748 and 61/700,757, both filed on Sep. 13, 2012. The subject matter of these earlier filed provisional patent applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to machine vision, and, more particularly, to video and image classification, clustering, and data fusion for remote sensing using fast, large scale neuroscience-inspired models employing sparse overcomplete feature dictionaries.

BACKGROUND

Recent developments in machine vision have demonstrated remarkable improvements in the ability of computers to properly identify particular objects in a viewing field. However, most of these advances rely on color-texture analyses that require targets objects to possess one or more highly distinctive, local features that can be used as distinguishing characteristics for a classification algorithm. Many objects, however, consist of materials that are widely prevalent across a wide variety of object categories.

The human visual system is one of the archetypal models of sensor fusion. Populations of specialized cells in the retina, thalamus, and cortex act as sensors responding in parallel to complementary attributes of the objects in view, such as spatial boundaries and grayscale textures, color signatures, motion cues, and depth cues from stereopsis. Information in these complimentary channels is fused in higher regions of the cortex, providing a rich representation of the world, even before additional fusion of information from other sense organs is provided, such as sense information from sound or touch. Neuroscience has revealed many properties of individual neurons and of the functional organization of the visual system that are believed to be essential to reach human vision performance, but are missing in standard artificial neural networks. Among these are extensive lateral and feedback connectivity between neurons, spiking dynamics of neurons, and sparse patterns across populations of neurons.

Equally important may be the scale of the visual cortex and the amount of visual input it receives. The human visual cortex consists of approximately 10 billion neurons, each with approximately 10,000 synaptic connections. A simple simulation at 10 flops per neuron to process one frame of data therefore requires approximately one petaflop ($10^{15}$ flops) of computation. In a year, the 6 million cones in an eye's retina and approximately 1 million fibers in the optic nerve deliver approximately one petapixel of information to the brain.

Computing hardware to support full scale implementations of hierarchical models for large scale datasets now exist. The Petascale Synthetic Visual Cognition team at Los Alamos National Laboratory (LANL) has developed large scale functional models of the visual cortex called Petascale Artificial Neural Network (PANN) that can operate on LANL's Roadrunner petaflop supercomputer, and on graphical processer unit (GPU) accelerated clusters. An initial run of a simple visual cortex (V1) code on Roadrunner achieved 1.144 petaflops during trials at the IBM facility in Poughkeepsie, N.Y. in June of 2008. The example PANN model also achieved real-time processing of grayscale high definition video (1080 p) on a cluster of 16 computer nodes, each accelerated by a graphics processing unit (GPU) (e.g., NVIDIA Fermi™). This scale of computing is often preferable for applications that require processing of regional-scale satellite imagery collections, for climate change studies, for disaster response, etc.

However, conventional approaches use large numbers of parameters in their models. For instance, some approaches use from 60 million to a billion parameters, and, in the latter case, approximately 16,000 computers are required to process a 200×200 pixel dataset. Accordingly, an improved approach to image processing may be beneficial.

SUMMARY

Certain embodiments of the present invention may provide solutions to the problems and needs in the art that have not yet been fully identified, appreciated, or solved by current image fusion technologies. For example, some embodiments of the present invention solve the issue of deciding what individuals in a population of visual system "neurons" are looking for using sparse overcomplete feature dictionaries. In some embodiments, these techniques can be applied to overhead remote sensing imagery and also to ground based video and imagery, including video and imagery common in social media.

Generally speaking, original data represented as a mathematical model having a certain size is taken and the data is projected into a higher order space where it can be represented with fewer terms. The projection may be achieved by solving a mathematical optimization problem that defines an overcomplete feature space (explicitly defined using a feature space "dictionary") and a sparse representation, and generally defines how both feature space and representation may be learned from the data using a non-convex basis pursuit algorithm. Examples of such an algorithm may be found in Rick Chartrand and Brendt Wohlberg, *A Nonconvex ADMM Algorithm for Group Sparsity with Sparse Groups*, in Proceedings of IEEE International Conference on Acoustics, Speech, and Signal Processing (ICASSP), (Vancouver, Canada), May 2013, and Rick Chartrand, *Generalized Shrinkage and Penalty Functions*, in IEEE Global Conference on Signal and Information Processing, 2013. Embodiments may be applied to many types of image data, including multi-sensor remote sensing image data, color video, large-format panchromatic (i.e., grayscale) photography, and microscopy images and video.

In one embodiment, a computer-implemented method includes learning, by a computing system, a sparse overcomplete feature dictionary for classifying and/or clustering a remote sensing image dataset. As used herein, an image dataset may include video and/or image data.

In another embodiment, a computer program is embodied on a non-transitory computer-readable medium. The computer program is configured to cause at least one processor to initialize atoms ($\phi_k$ of a feature dictionary $\Phi$ either by imprinting a set of unlabeled patches x, or by initializing $\phi_k$ using random vectors. The computer program is also configured to cause the at least one processor to seek a coefficient vector y for each unlabeled patch in x such that y is sparse and Φy approximates x. The computer program is further configured to cause the at least one processor to find an approximate solution for y and update Φ using a learning rule.

In yet another embodiment, an apparatus includes memory storing computer program instructions and at least one processor configured to execute the computer program instructions. The at least one processor is configured to learn a sparse overcomplete feature dictionary for an image dataset and build a local sparse representation of the image dataset using the learned feature dictionary. The at least one processor is also configured to apply a local maximum pooling operation on the local sparse representation to produce a translation-tolerant representation of the image dataset. The at least one processor is further configured to classify and/or cluster an object within the translation-tolerant representation of the image dataset using a supervised classification algorithm or an unsupervised clustering algorithm.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1A:
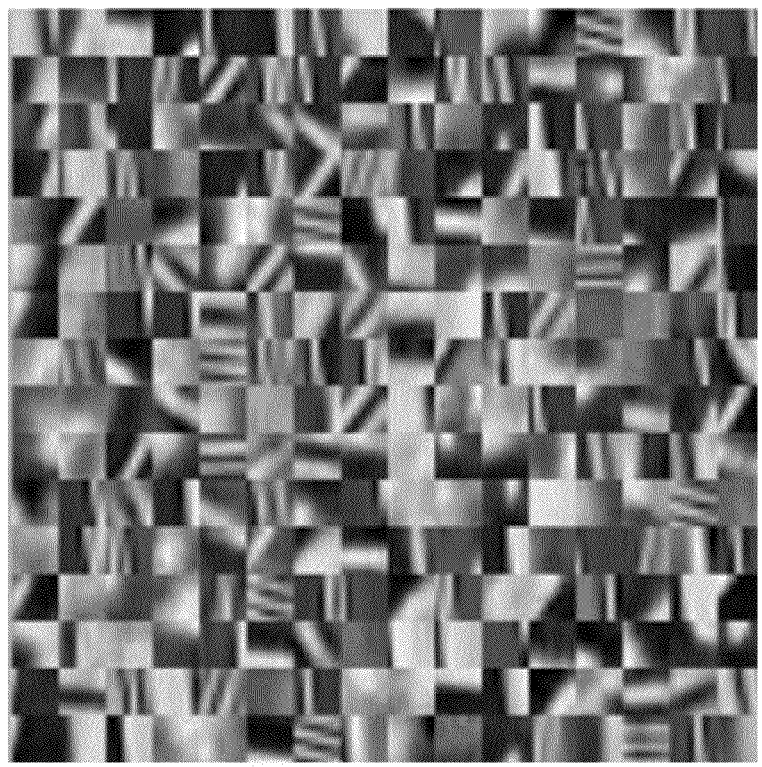
FIG. 1A is an image illustrating a learned overcomplete color/texture dictionary for a helicopter dataset, according to an embodiment of the present invention.

Some embodiments of the present invention use sparse overcomplete feature dictionaries to decide what individual "neurons" are looking for. These models may be generative to allow reconstruction of the input image, and may be compatible with hierarchical models of the cortex. Such embodiments may extend standard hierarchical model and X (HMAX) approaches. They can also drive many-category classification of image patches for object detection within a large video frame. For example, FIG. 1A is an image 100 illustrating a learned overcomplete color/texture dictionary for a helicopter dataset, according to an embodiment of the present invention.

Figure 1B:
FIG. 1B is an image illustrating an image patch from a training sequence, according to an embodiment of the present invention.
Figure 1C:
FIG. 1C illustrates a reconstruction of the image patch of FIG. 1B using local sparse representations over the learned dictionary, according to an embodiment of the present invention.

The retinal model of some embodiments down-samples the input frame to remove video compression artifacts and reduce computational expense. The primary visual cortex (V1) S-cell layer may use the learned dictionary to build a local sparse representation, corresponding to a cortical column, using a greedy matching pursuit algorithm. The S-cell columns may be very sparse with less than 5% of local feature detectors active in any given column. However, the columns may still allow for good reconstruction of the input image in distinction to standard HMAX approaches (e.g., reconstructed image patch 120 of FIG. 1C, which corresponds with training image patch 110 of FIG. 1B). The V1 C-cell layer may apply a local max pooling operation, producing a translation-tolerant representation of image patches. Even after pooling, the C-cell columns may be quite sparse. Many embodiments do not use frame differencing. This facilitates detection of objects that are stationary within the frame.

Figure 2A:
FIG. 2A illustrates a frame of final car detections for a training image, according to an embodiment of the present invention.
Figure 2B:
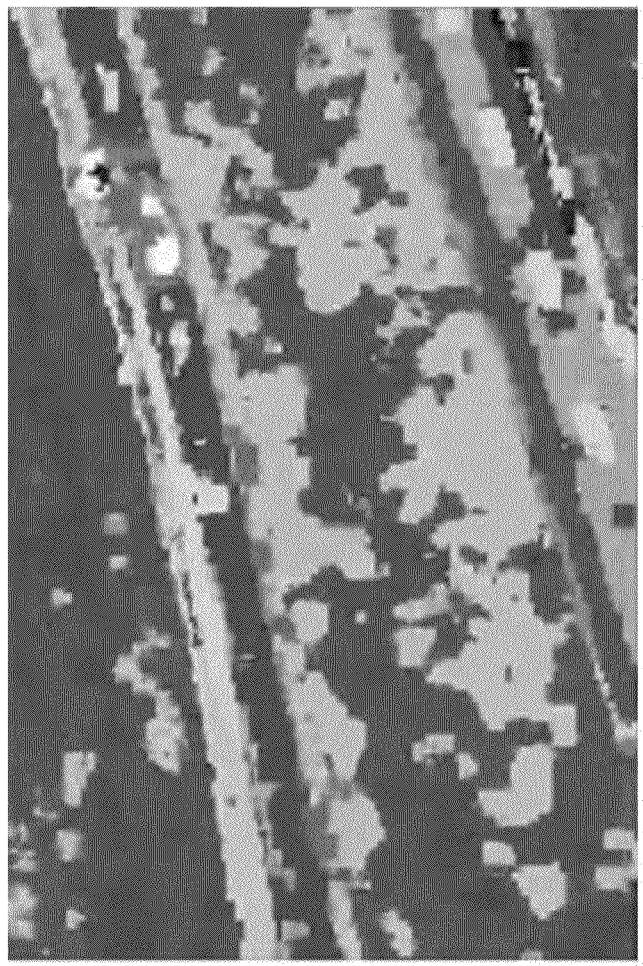
FIG. 2B illustrates an internal model of the frame of FIG. 2A that detects various feature categories, including cars, lane markings, grass, bushes, and road, according to an embodiment of the present invention.

For object detection and classification, a multi-category generative model may be used based on k-means clustering of the sparse C-cell column responses. Such a model may be trained in a semi-supervised way, allowing the image background to divide up into unlabeled categories (e.g., 30 unlabeled categories) that, on inspection, appear strongly correlated with naturally occurring background scene object categories, including tree foliage, grass, pavement, water, and beach (see frame 200 and model 210 of FIGS. 2A and 2B, respectively). Setting the number of categories is a meta-learning task. This set of background categories may then be augmented with a number of target categories learned using the same sparsifying dictionaries for labeled image patches (i.e., supervised learning may be used for target categories). The final image patch classifier algorithm may be a Euclidean (L2) minimum distance classifier in this multi-category space of category mean vectors. The multi-category classifier may be a small component of the overall computation time, which tends to be dominated by the formation of sparse representations in V1 S-cell columns. The classifier may produce whole scene visualizations that provide additional contextual cues for object classification (e.g., correlation of cars with roads, boats with water, etc.).

The PANN Model

PANN is a hierarchical model of the visual cortex based on the Neocognitron/HMAX models. PANN is designed to study computation in the brain, but is also capable of detecting objects in images and video. These models start with retina-like contrast equalization preprocessing of the input using a local contrast adjusting transformation. Cortical visual regions V1 and V2 are then modeled with a columnar organization of S-cells and C-cells, corresponding to "simple" and "complex" cells in Hubel and Wiesel's model of V1, and to their generalizations in higher visual areas. Each column sees the same receptive field size over its input (retina or V1, respectively). Each S-cell has a tuning, specified by a synaptic weight vector, and a tuning width, which defines the feature to which that particular S-cell is sensitive. In principle, each column could develop a unique set of weight vectors and tuning widths, but in practice, the models are greatly simplified by the imposition of a fixed tuning width for all S cells and by the imposition of translational invariance by making all the columns in a layer identical.

Figure 3:
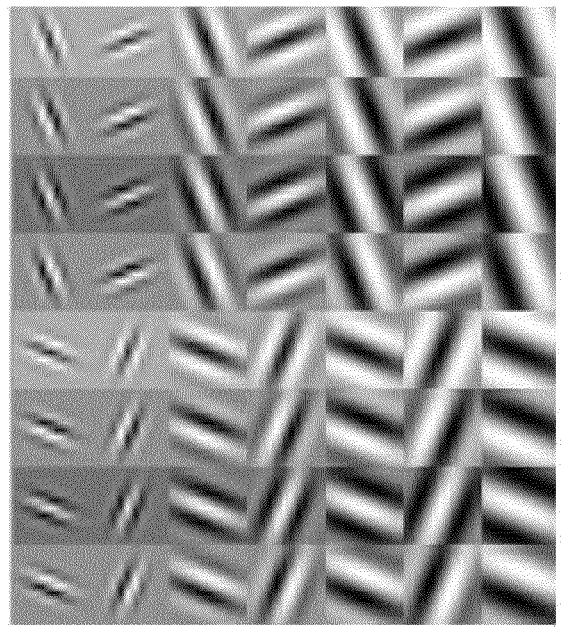
FIG. 3 illustrates V1 simple cell weight vectors generated by Gabor functions covering a range of orientations, scales, and phases.

The standard model for S-cells that is generally employed uses the radial basis function $$s_j = g_{RBF}(w_j, x) = \exp(-(w_j - x)^2 / 2\sigma) \quad (1)$$

where $x = \{x_i\}$ is the N-pixel grayscale normalized image patch (i.e., Euclidean norm $\|x\|_2 = [\Sigma_i |x_i|^2]^{1/2} = 1$) input to the S-cell, $w_j$ represents the synaptic weights, and $\sigma$ parameterizes the bell shaped tuning of the neuron. To represent the observed range of edge tuned and bar tuned neurons in the primary visual cortex, it is common to choose the weight vectors $w_j$ to be a set of Gabor functions parameterized by orientation $\theta$, eccentricity $\gamma$, envelope width $\sigma$, spatial wavelength $\lambda$, and phase $\phi$, using the equation $$w_j(\theta, \gamma, \sigma, \lambda, \phi) = \exp(-(x_\theta^2 + \gamma y_\theta^2)/2\sigma)\cos\left(\frac{2\pi x_\theta^2}{\lambda} + \phi\right) \quad (2)$$

where the pixel co-ordinates (x, y) have been rotated through an angle $\theta$ to give $(x_\theta, y_\theta)$. The weight vector has unit norm ($\|w_j\|_2 = 1$). Typical values for these parameters are set by reference to experimental data, and FIG. 3 shows a set of human chosen weight vectors 300 for V1.

C-cells, as generally used, are designed to improve tolerance to small shifts in the input by imposing local translational invariance, implemented as winner-take-all max functions over the cell's receptive field, defined by $$c_j = g_{MAX}(s) = \max(\{s_{i \in N_j}\}) \quad (3)$$

where the input s is a patch of responses from the previous S-cell layer and $N_j$ defines the receptive field of the $j^{th}$ C cell.

In cortical region V2, the S cell layer is again implemented as a layer of radial basis functions with input from the complex cell layer of V1, $s^{II}_j = g_{RBF}(W^{II}_j, c^J)$. There is no standard closed-form expression for calculating V2 S-cell weight vectors, so these are learned though either "imprinting" (i.e., memorization of patches of V1 complex cell output produced during presentation of a training set of images) or using biologically-inspired learning rules described below. Additionally, in keeping with estimates of the number of neurons in different regions of visual cortex, the spatial extent of each layer is reduced by a down-sampling factor that should match the increase in the number of features calculated in a cortical column over each receptive field. Typically, a down-sampling value of 2 is set along each image axis, consistent with experimental data showing the growth of neuron receptive fields between layers.

The final classification stage of this model, representing the inferotemporal cortex (IT), is implemented using a supervised statistical classifier, typically a support vector machine (SVM). PANN uses the standard LIBSVM package. To reduce the complexity of the global image representation given to the support vector machine for whole image classification, the final C-cell layer can implement a global max over each of the features learned by the final S-cell layer. Alternatively, and necessarily for detection of objects in overhead imagery, the SVM can process patch-wise feature vectors for localized detection of targets.

Feature Learning

Published results with HMAX/Neocognitron models have used a preselected set of Gabor tunings for V1 neurons, and imprinting of neurons in V2. Alternatively, several learning rules to compute these representations have been proposed, of which the simplest is a modified Hebbian learning rule. This can be derived from an energy function minimization formulation for a sparse representation of the input image, in which case the set of weight vectors constitute an over-complete "dictionary" of features. The learning rule is defined by $$\Delta w_j = \eta y_j (x - y_j w_j) \quad (4)$$

where $y_j$ is the activity of the neuron in response to input x and $\eta$ is a parameter controlling the learning rate. Consider a model of V1 with online Hebbian-type learning including the following additional conditions. The V1 column weight vectors $\{w_j\}$ are initialized by imprinting (i.e., memorizing) each of the F simple cells in the cortical column. On presentation of an unlabeled input x, the activity of each simple cell is calculated using $$\forall j = 1 \ldots F, s_j = g_{RBF}(w_j, x) \quad (5)$$

Figure 4:
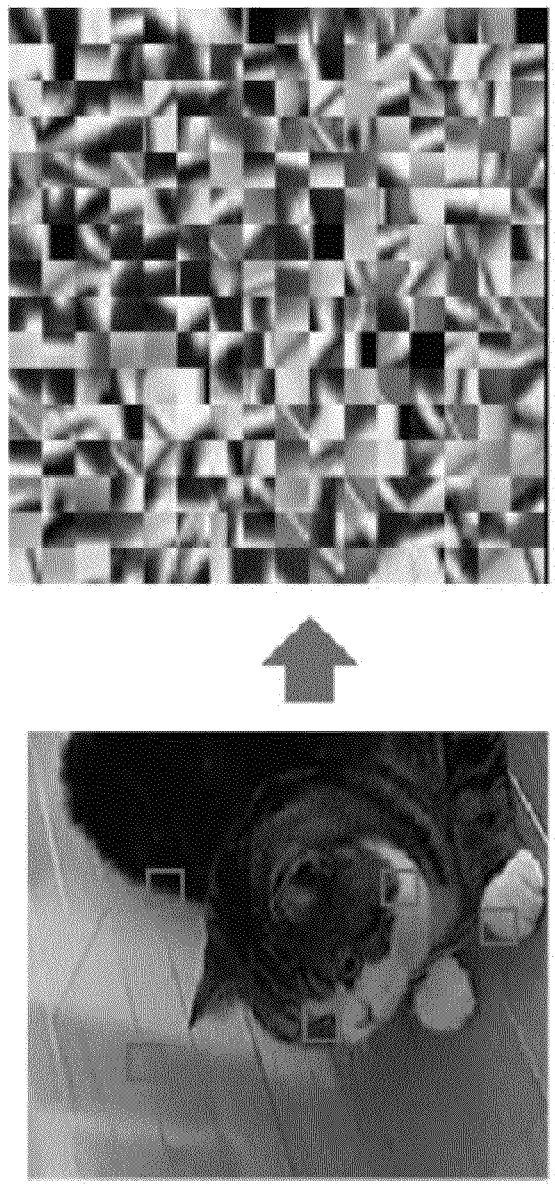
FIG. 4 illustrates frames from a color video used to determine V1 simple cell color/texture dictionary atoms by Hebbian learning.

The neuron $j^*$ with the largest activation $s_{j^*}$ is selected (i.e., winner-take-all) for updating according to the conventionally used Hebbian learning rule, $\Delta w_{j^*} = \eta s_{j^*}(x - s_{j^*} w_{j^*})$. The neuron is then renormalized to unit norm ($\|w_{j^*}\|_2 = 1$). FIG. 4 illustrates frames 400 from a color video used to determine V1 simple cell color/texture dictionary atoms 410 by Hebbian learning.

While the standard HMAX model takes grayscale imagery as input, there is a straightforward extension of this model to color imagery, or, in principle, to vector data of any dimension. For example, for color video, an input patch can be defined to be a three dimensional cube of pixels from the red, green, and blue bands for a frame. This image cube can be normalized using the entry-wise Frobenius norm, $\|x\|_F := (\Sigma_{ijc} |x_{ijc}|^2)^{1/2} = 1$, and then the rest of the learning algorithm proceeds as usual. FIG. 4 shows the result of learning a dictionary of color/texture weight vectors for standard definition color video (i.e., 640×480 pixels/frame, 30 frames per second). Approximately 1 million 9×9×3 pixel patches were extracted from approximately 30 seconds of color video. Patches were sampled randomly with replacement from the frames. This dataset was used to learn a set of 256 color/texture weight vectors, which can be used to construct sparse representations of previously unseen color image patches. The dictionary 410 has learned weight vectors that are sensitive to color-free spatial detail (i.e., edges and grating-like textures), and also a set of weight vectors that are sensitive to particular colors, but are lacking in spatial structure. This learned specialization recalls the observed pattern of tuning in V1 neurons. This model can be extended to multi-spectral imagery as follows.

Learned Sparse Overcomplete Feature Dictionaries for Multi-Spectral Imagery

Consider a satellite image collected at a set of B spectral bands (e.g., visible, infrared, or other sensor modalities). These bands may come from the same sensor in a single observation, or from multiple sensors and/or multiple observations through an arbitrary interval of time (including frames of a video sequence). It may be assumed that these bands have been spatially co-registered using standard techniques to an appropriate level of alignment.

A standard approach to representing this data for target detection would be to consider the set of B-dimensional vectors that "skewer" the multi-spectral image at each position (i,j) in the image plane. More sophisticated approaches may try to capture textural information in the local neighborhood patch using local texture measures drawn from a standard orthonormal wavelet basis or histograms over local orientation features (e.g., David Lowe's Scale Invariant Feature Transform (SIFT) descriptors that are discussed, for example, in Lowe D., *Distinctive Image Features from Scale Invariant Keypoints*, International Journal of Computer Vision, Vol. 60, Num. 2, pages 91-110, 2004), or develop human-designed spectral indices (e.g., normalized difference vegetation index (NDVI)) based on explicit knowledge of sensor and target phenomenology. Unfortunately, a standard orthonormal basis or local grayscale orientation may fail to capture the salient features needed to detect and distinguish between a range of targets. Furthermore, human design of features is time consuming and expensive and may be limited by lack of familiarity with a novel combination of sensors.

Instead, some embodiments learn a dictionary $\Phi$ that enables sparse overcomplete representation of image patches x. This type of representation has several theoretical advantages: (1) it is adapted to the data; (2) it can be learned automatically without labeling; and (3) it can suppress additive white noise in the data. The usefulness of this type of representation for detection and classification has been shown for several applications, and will demonstrated by way of example here for detecting vegetation in multi-spectral satellite imagery.

Figure 5:
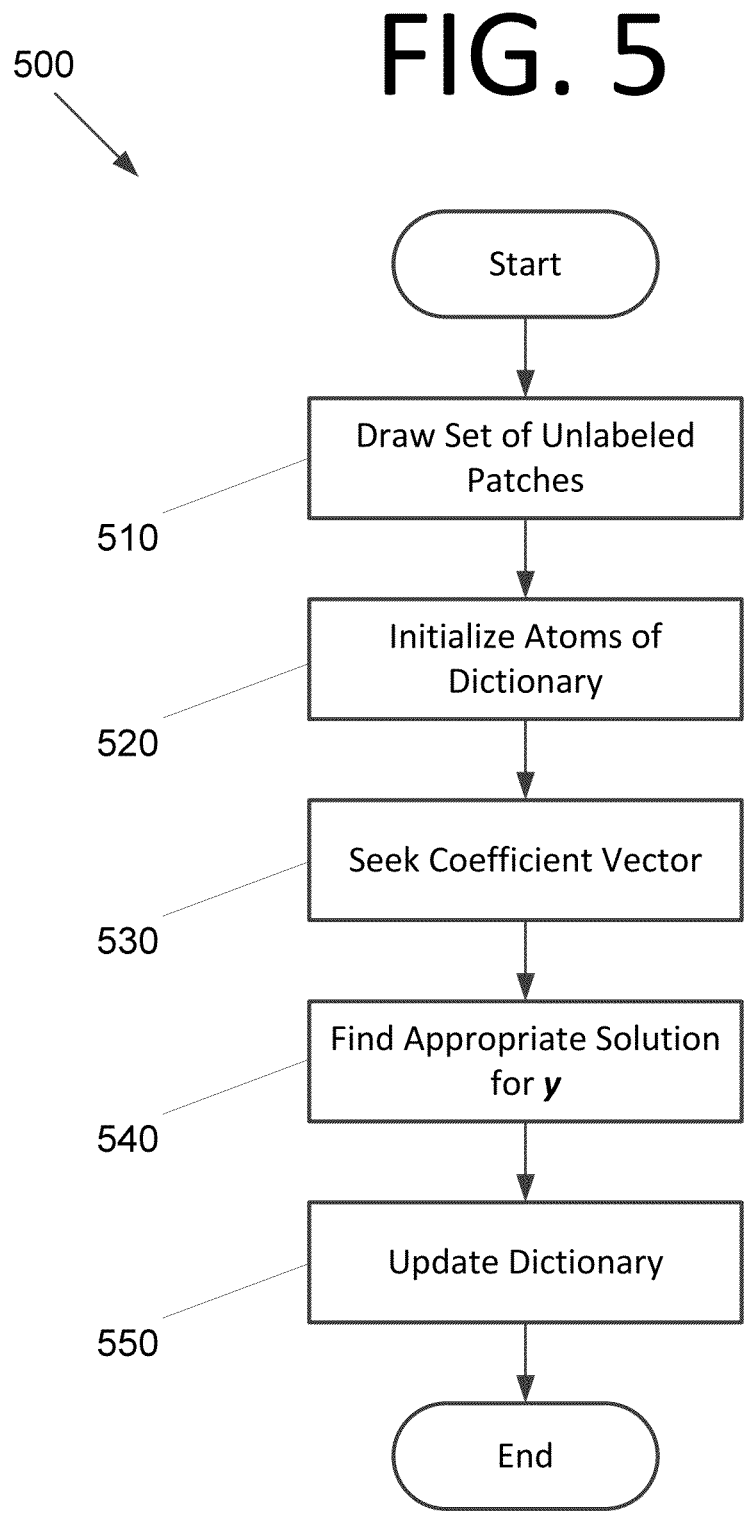
FIG. 5 is a flowchart illustrating a method for generating a sparse overcomplete feature dictionary, according to an embodiment of the present invention.

FIG. 5 is a flowchart 500 illustrating a method for building a sparse overcomplete feature dictionary, according to an embodiment of the present invention. In some embodiments, the method of FIG. 5 may be performed, for example, by computing system 900 of FIG. 9. First, a set of unlabeled patches x of size H×W×B pixels is drawn at 510, where height H and width W define the spatial size of the patch. Next, the atoms $\phi_k$ of the dictionary $\Phi$ are initialized at 520 by imprinting (i.e., memorizing) patches drawn from the image. Following the known and conventionally emulated work of Olshausen and Field, for each patch x drawn from a training set, a coefficient vector y is sought at 530 such that y is as sparse as possible and $\Phi y$ is a sufficiently good approximation to the input x, $$\min_y \|y\|_0, \text{such that } \|x-\Phi y\|_F < \epsilon \quad (6)$$

for a user-specified tolerance, e.g., $\epsilon$ equal to 5% to the original image energy $\|x\|_F$. The exact solution of this problem is intractable (NP-hard), but an approximate solution for y may be found using a simple matching pursuit algorithm that enables a fast implementation on a GPU, which may be included as one or more of processor(s) 910 of FIG. 9. Alternative approaches to forming good approximate sparse representations include more sophisticated orthogonal matching pursuits, an l-1 convex basis pursuit, or a non-convex basis pursuit. Thus, an approximate solution for y is found at 540 using a simple matching pursuit algorithm or a non-convex basis pursuit algorithm such as that described in Rick Chartrand, *Generalized Shrinkage and Penalty Functions*, IEEE Global Conference on Signal and Information Processing, 2013.

Given x and y, the dictionary $\Phi$ is updated at 550 using the Hebbian learning rule (with learning rate $\eta$), $$\forall \phi_k \in \Phi, \Delta\phi_k = \eta y_k(x-\Phi y) \quad (7)$$

Figure 6:
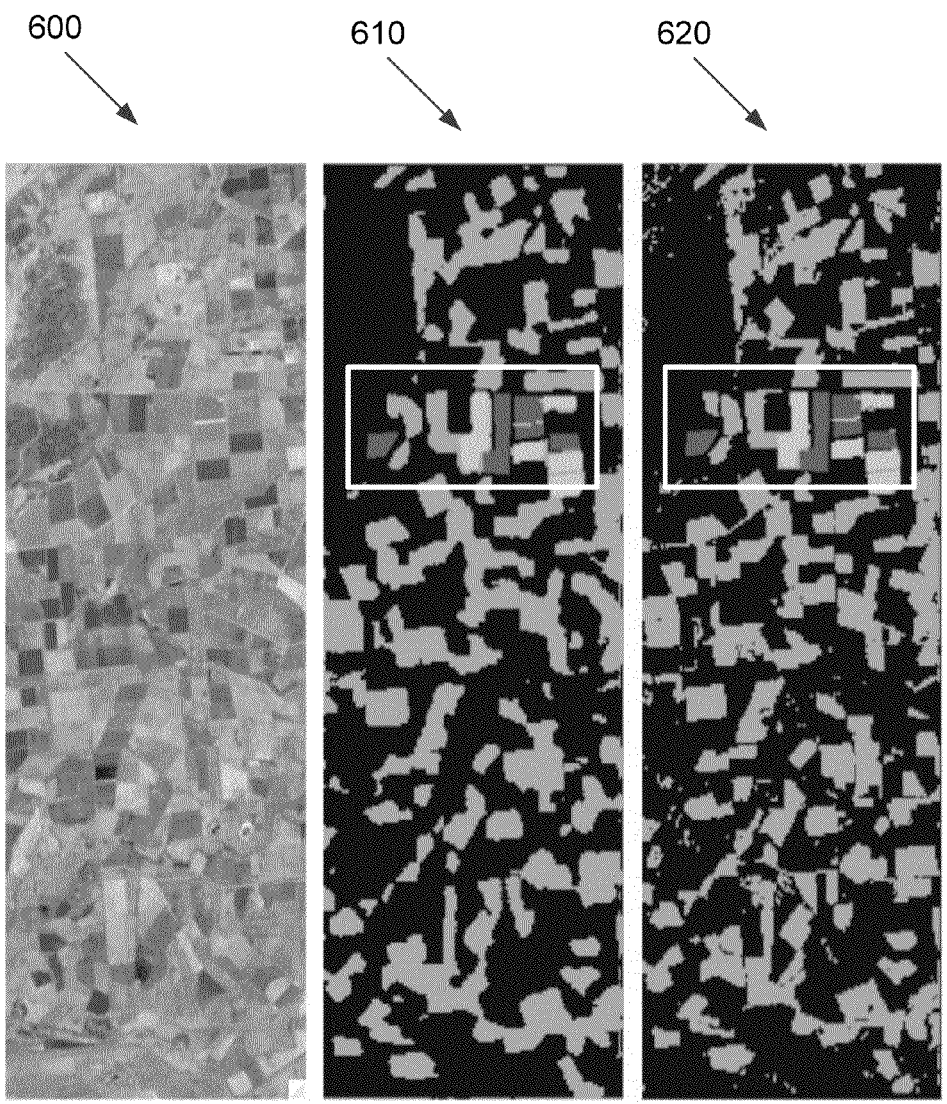
FIG. 6 illustrates a NASA Hyperion image of an agricultural region, rice fields detected by feature classification from the learned dictionary, and rice fields detected by classification of 10-band spectral vectors with no neighborhood information, according to an embodiment of the present invention.

FIG. 6 shows an example satellite image 600 of an agricultural area growing several commercial crops and various uncultivated paddocks and riparian and scrub vegetation regions. This image is a NASA Hyperion image (220-channel hyper-spectral imager, 0.4-2.5 µm visible/NIR/SWIR, ground sample distance of ~30 m/pixel), binned into 10 broad spectral bands representing a hypothetical multi-spectral sensor. Ground truth provided by NASA was used to mark by hand example regions containing a particular crop, rice fields, and examples of regions not containing rice fields, as denoted by the white rectangles in images 610 and 620. The image is of size 256×700×10 pixels. 250,000 unlabeled patches were drawn from the image, each of size 7×7×10 pixels and this unlabeled training set was used to learn a dictionary $\Phi$ of 512 atoms $\phi_k$. This dictionary is slightly overcomplete with respect to the dimensions of the input patches.

A ground truth map and a simple raster paint tool were then used to mark up 6557 pixels containing rice crops and 6700 pixels containing other surface features (sorghum crop fields, fallow corn fields, bare paddocks, riparian regions, and scrub vegetation). The dictionary $\Phi$ was used to construct sparse representations for patches centered on the marked up pixels, and these feature vectors were used to train a linear-kernel SVM binary classifier. The samples sent to the supervised classifier are not independent and identically distributed (i.i.d.), but as is common in image analysis, these samples were treated as though they were. On an independent test set of 2261 rice field pixels and 2378 non-rice field pixels, the SVM classifier achieves an accuracy of 98.9%. Qualitatively, as shown in FIG. 6, this is a good result that generalizes well throughout the image.

Figure 7A:
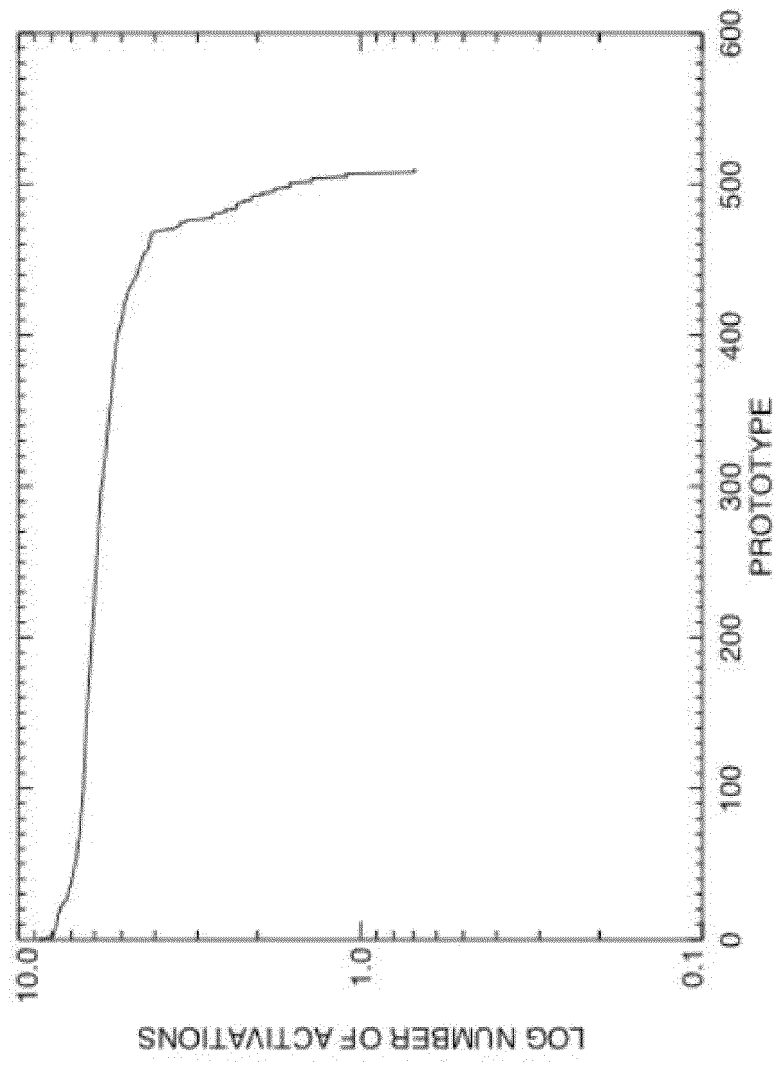
FIG. 7A is a graph illustrating the log of the number of activations for dictionary atoms during training, according to an embodiment of the present invention.
Figure 7B:
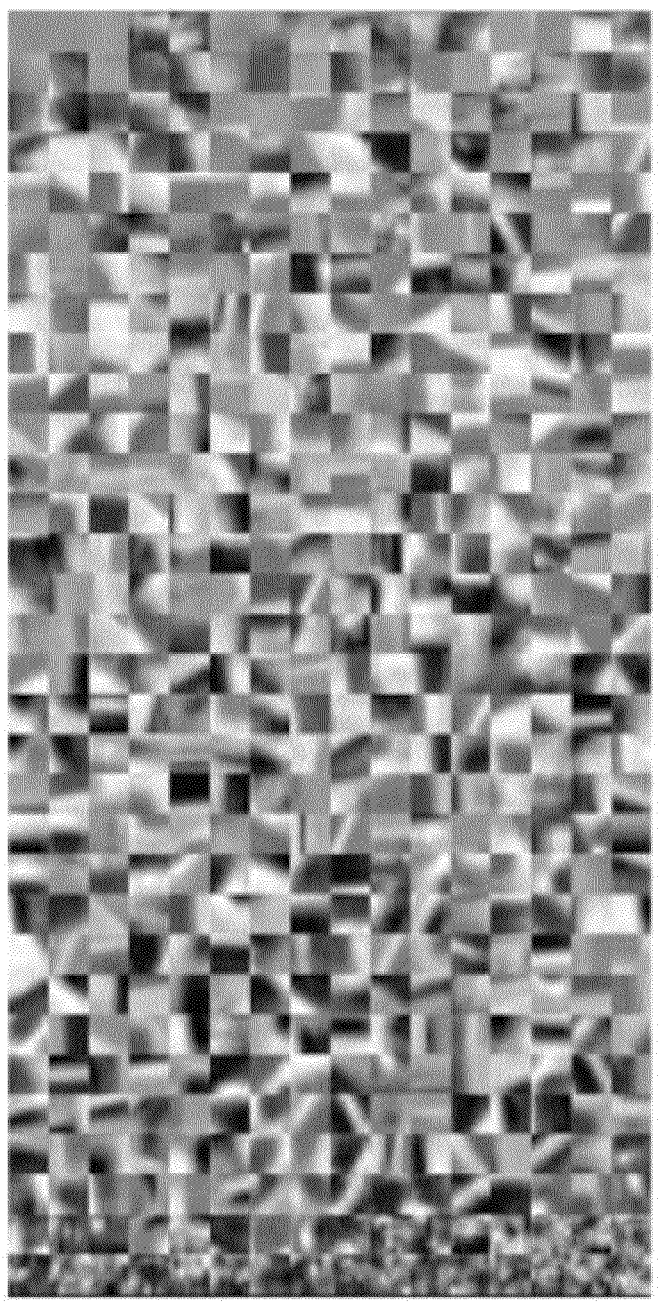
FIG. 7B illustrates a learned dictionary for a 10-band image, sorted by activation, according to an embodiment of the present invention.
Figure 7C:
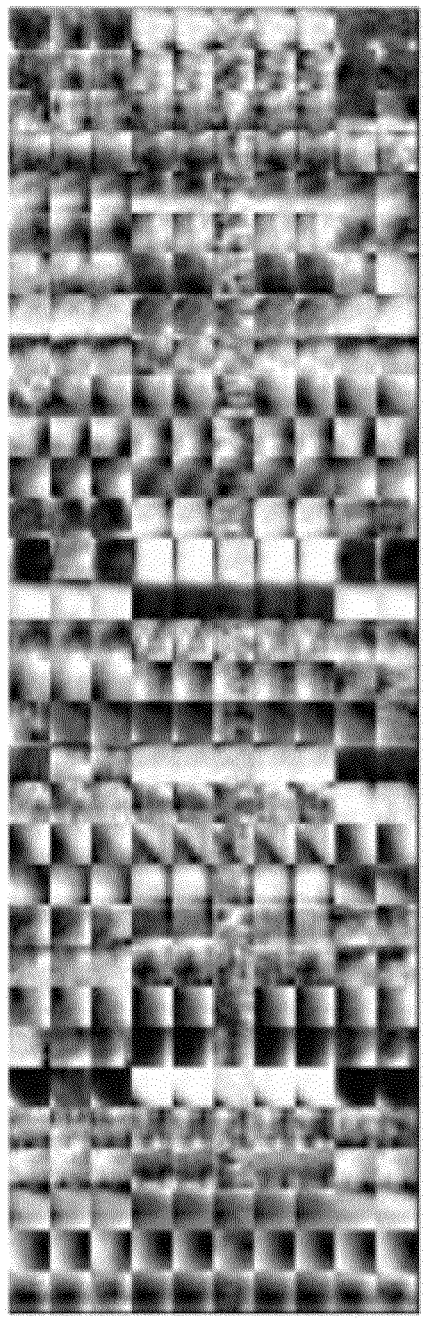
FIG. 7C illustrates all 10 bands for each of the 32 most active dictionary atoms, from shortest to longest wavelength, according to an embodiment of the present invention.

This result was compared to a standard linear kernel SVM classifier trained on the 10-dimensional spectral vectors with no neighborhood information. The corresponding SVM accuracy on the same test set is 98.0% (i.e., twice the error rate of the proposed technique of some embodiments), and qualitatively many small regions of false detection may be seen that would require further processing to remove in image 620. Visualizing the 10-band atoms in the learned dictionary is itself an area of research. In image 710 of FIG. 7B, the visible (red-green-blue) components of the dictionary atoms are shown, ranked by how many times they won the winner-take-all competition for update during training (i.e., activations). Graph 700 of FIG. 7A shows the distribution of this number of "activations" across the dictionary, and approximately constant activation is seen, suggesting that the dictionary is making good use of available atoms. Equal activation of a learned dictionary has been seen for standard grayscale dictionaries, and suggests interesting statistical independence properties of these dictionaries. Image 720 of FIG. 7C shows all the bands for the 32 most active dictionary atoms, and some interesting correlations can be seen between blocks of spectral bands at visible, near-infrared, and short wave infrared frequencies. Also, the presence of spatial textures can be seen in some of the dictionary atoms.

Figure 8:
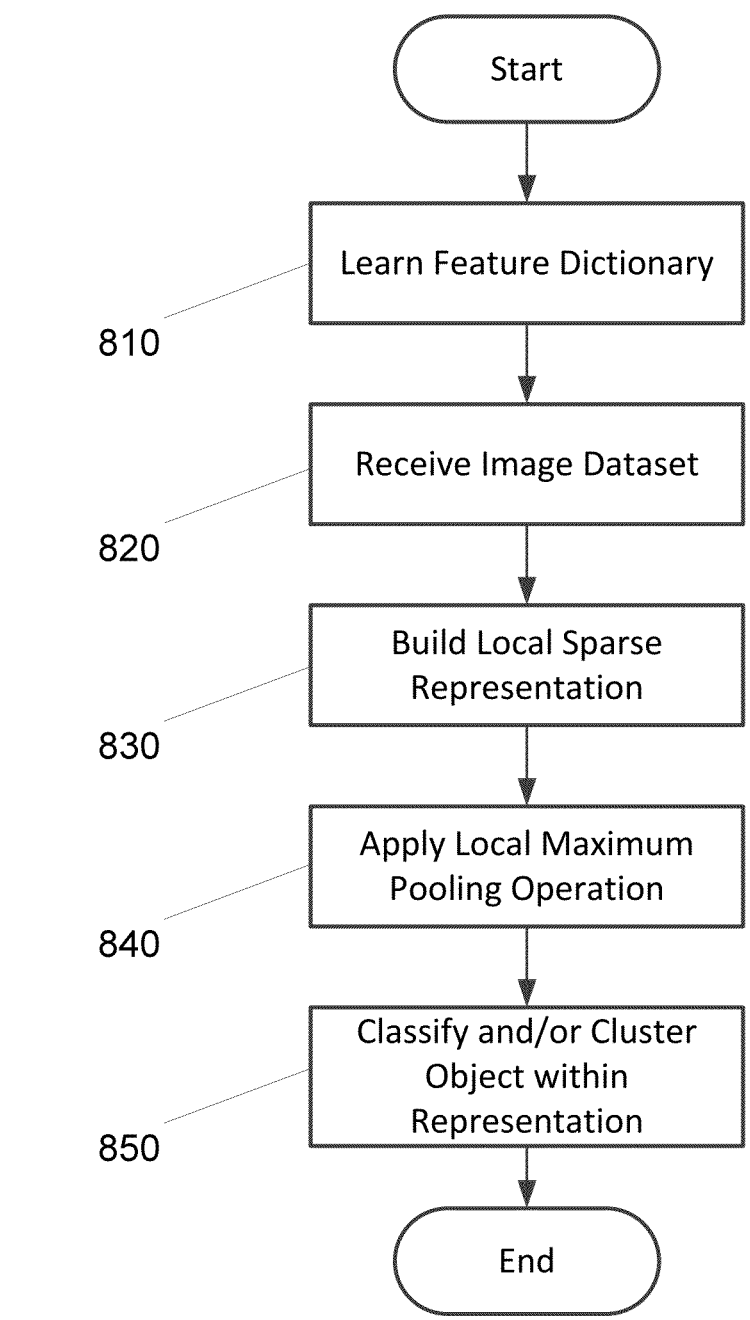
FIG. 8 is a flowchart illustrating a method for classifying and/or clustering objects in an image dataset, according to an embodiment of the present invention.

FIG. 8 is a flowchart 800 illustrating a method for detecting objects in an image dataset, according to an embodiment of the present invention. In some embodiments, the method of FIG. 8 may be performed, for example, by computing system 900 of FIG. 9. The method begins with learning a sparse overcomplete feature dictionary for an image dataset at 810. An image dataset is then received at 820. A local sparse representation of the image dataset is built at 830 using the learned sparse overcomplete feature dictionary.

A local maximum pooling operation of the local sparse representation is applied at 840 to produce a translation-tolerant representation of the image dataset. Then, an object is classified and/or clustered within the representation of the image dataset at 850 using a supervised classification algorithm (e.g., a support vector machine (SVM)) or an unsupervised clustering algorithm (e.g., k-means clustering in the sparse representation space). In this manner, one or more objects may be detected and/or categorized within the image dataset. In some embodiments, multiple objects may be detected substantially simultaneously within the image dataset. As used herein, the image dataset may include still images and/or video images. For example, some embodiments may be configured to operate on one or more video frames either in series or in parallel.

Such embodiments have numerous benefits over conventional approaches. These benefits include, but are not limited to: (1) the ability to learn, enabling more efficient classification and detection; (2) the ability to handle video and color; and (3) the ability to determine normative facts about the detected objects. For instance, embodiments may not only identify an object such as a car within an image dataset, but may also determine where the object is located (e.g., in the parking lot, on the road, in the right lane, etc.). Although embodiments are described with reference to image datasets, those of ordinary skill in the art will readily appreciate that the principles set forth herein are equally applicable to other types of data, including, but not limited to, as audio data, multimodal data, medical imaging data, non-visible spectrum imaging data, etc.

In some embodiments, PANN may be modified to learn a sparse overcomplete color/texture feature dictionary for the dataset. The example retinal model may down-sample the input frame to remove video compression artifacts and reduce computational expense. The example primary V1 S-cell layer may use the learned dictionary to build a local sparse representation (corresponding to a cortical column) using a basis pursuit algorithm or a matching pursuit algorithm, for example. The example S-cell columns are generally very sparse, with typically <5% of local feature detectors active in any given column. However, the example S-cell columns still allow for good reconstruction of the input image in distinction to standard HMAX approaches. The example V1 C-cell layer may apply a local max pooling operation, producing a translation-tolerant representation of image patches. Even after pooling, the example C-cell columns are generally quite sparse. PANN does not use frame differencing, which allows some embodiments to detect objects that are stationary within the frame.

For object detection and classification, some embodiments may utilize a multi-category generative model based on k-means clustering of the sparse C-cell column responses. This model may be trained in a semi-supervised way, allowing the image background to divide up into a desired number of unlabeled categories that, on inspection, appear strongly correlated with naturally occurring background scene object categories, such as tree foliage, grass, pavement, water, and beach. Some embodiments then augment this set of background categories with the target categories learned using the same sparsifying dictionaries for labeled image patches (i.e., using supervised learning for target categories). The final image patch classifier algorithm can be a Euclidean (L2) minimum distance classifier in this multi-category space of category mean vectors, although any other suitable classification algorithm can also be used additionally or alternatively. The multi-category classifier is a relatively small component of the overall computation time, which is dominated by the formation of sparse representations in V1 S-cell columns, and produces whole scene visualizations that provide additional contextual cues for object classification (e.g., correlating cars with roads, boats with water, etc.).

As noted above, data input can be any rich data set such as visual, audio, or almost any type of data stream, including multi-modal imagery. Some embodiments build an overcomplete dictionary from the data using supervised or unsupervised learning, or a combination of the two. While it is building the dictionary or after one has been built, some embodiments then search the dictionary for sparse representations of interesting patterns. Suitable patterns can be objects in an image, sound patterns, or any other patterns that exist in the data set. These patterns can be identified by a user or autonomously. When data is encountered for the first time, some embodiments first try to recreate patterns using the dictionary and use a classifier to search for sparse representations of patterns of interest. The output may show where patterns are found. As such, repeated use of some embodiments in the same modality on similar data permits the system to grow, learn, adapt, and successfully mimic hierarchical models of the visual cortex.

Figure 9:
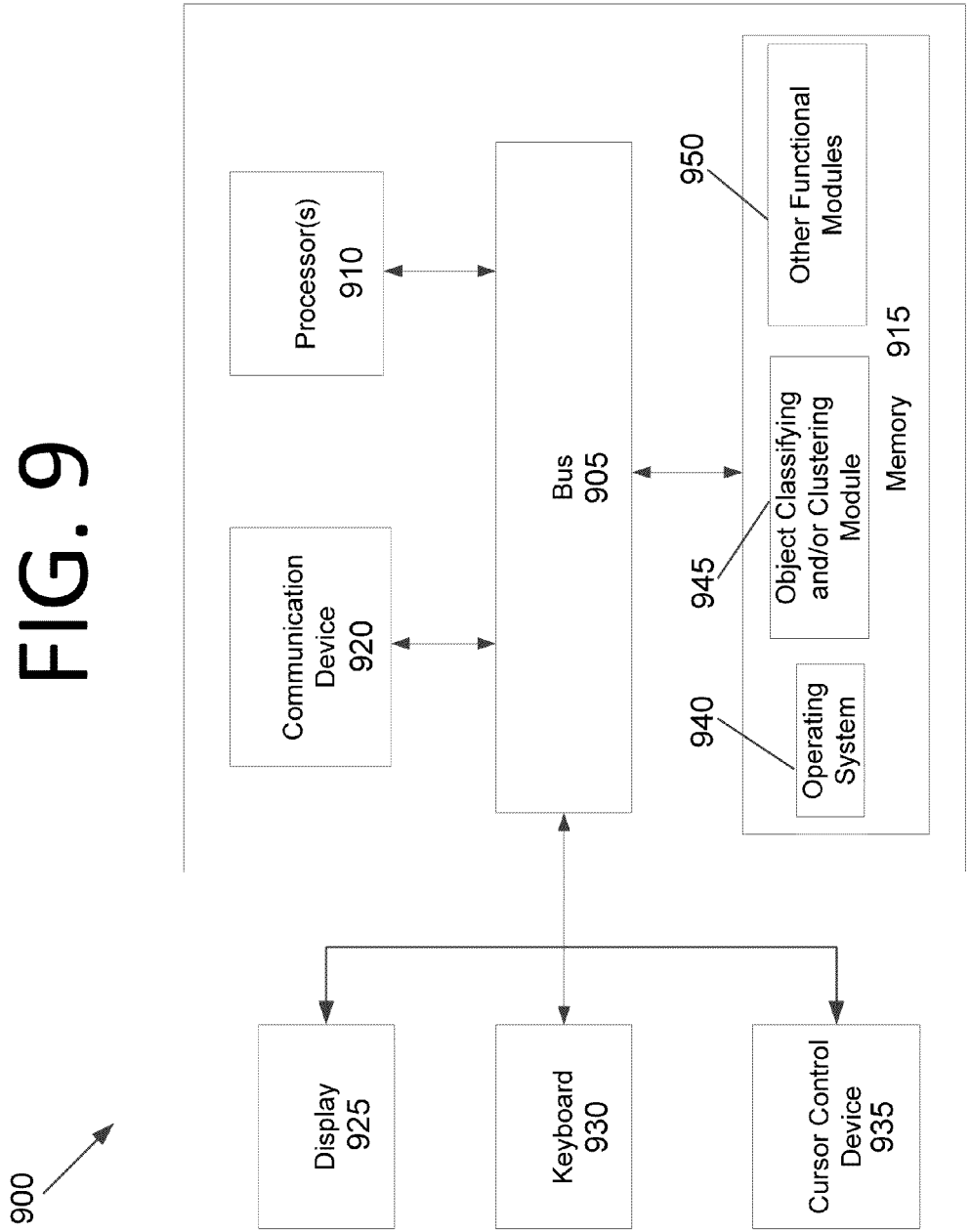
FIG. 9 is a block diagram of a computing system configured to detect objects in an image dataset, according to an embodiment of the present invention.

FIG. 9 is a block diagram of a computing system 900 configured to detect objects in an image dataset, according to an embodiment of the present invention. Computing system 900 includes a bus 905 or other communication mechanism for communicating information, and processor(s) 910 coupled to bus 905 for processing information. Processor(s) 910 may be any type of general or specific purpose processor, including a central processing unit ("CPU") or application specific integrated circuit ("ASIC"). Processor(s) 910 may also have multiple processing cores, and at least some of the cores may be configured to perform specific functions. Computing system 900 further includes a memory 915 for storing information and instructions to be executed by processor(s) 910. Memory 915 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 900 includes a communication device 920, such as a transceiver, to wirelessly provide access to a communications network.

Non-transitory computer-readable media may be any available media that can be accessed by processor(s) 910 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 910 are further coupled via bus 905 to a display 925, such as a Liquid Crystal Display ("LCD"), for displaying information to a user. A keyboard 930 and a cursor control device 935, such as a computer mouse, are further coupled to bus 905 to enable a user to interface with computing system 900. However, in certain embodiments such as those for mobile computing implementations, a physical keyboard and mouse may not be present, and the user may interact with the device solely through display 925 and/or a touchpad (not shown). Any type and combination of input devices may be used as a matter of design choice.

In one embodiment, memory 915 stores software modules that provide functionality when executed by processor(s) 910. The modules include an operating system 940 for computing system 900. The modules further include an object detection module 945 that is configured to use a sparse overcomplete feature dictionary to classify and/or cluster objects within an image dataset. Computing system 900 may include one or more additional functional modules 950 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIGS. 5 and 8 may be performed by a computer program, encoding instructions for the nonlinear adaptive processor to perform at least the methods described in FIGS. 5 and 8, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 5 and 8, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In order to determine the metes and bounds of the invention, therefore, reference should be made to the appended claims.

The invention claimed is:

1. A computer-implemented method, comprising:
learning, by a computing system, a sparse overcomplete feature dictionary for classifying and/or clustering a remote sensing image dataset;
building, by the computing system, a local sparse representation of the image dataset using the learned sparse overcomplete feature dictionary; and
applying, by the computing, system, a local maximum pooling operation on the local sparse representation to produce a translation-tolerant representation of the image dataset.

2. The computer-implemented method of claim 1, wherein the learning of the sparse overcomplete feature dictionary comprises:
initializing, by the computing system, atoms $\phi_k$ of a feature dictionary $\Phi$ either by imprinting a set of unlabeled patches x, or by initializing $\phi_k$ using random vectors;
for each unlabeled patch in x, seeking, by the computing system, a coefficient vector y such that y is sparse and $\Phi y$ approximates x;
finding, by the computing system, an approximate solution for y; and
updating $\Phi$, by the computing system, using a learning rule.

3. The computer-implemented method of claim 1, wherein the building of the local sparse representation of the image dataset comprises applying a greedy matching pursuit algorithm or a non-convex basis pursuit algorithm.

4. The computer-implemented method of claim 1, further comprising:
down-sampling the image dataset, by the computing system, prior to building the local sparse representation of the image dataset.

5. The computer-implemented method of claim 1, further comprising:
classifying and/or clustering, by the computing system, an object within the translation-tolerant representation of the image dataset using a supervised classification algorithm and/or an unsupervised clustering algorithm.

6. The computer-implemented method of claim 5, wherein the classifying and/or clustering of the object comprises categorizing the translation-tolerant representation of the image dataset in a predetermined number of categories.

7. The computer-implemented method of claim 6, wherein the categorizing of the translation-tolerant representation of the image dataset comprises applying a cluster model to the translation-tolerant representation of the image dataset.

8. The computer-implemented method of claim 6, further comprising:
augmenting, by the computing system, a predetermined number of background categories with a number of target categories using the sparse overcomplete feature dictionary and supervised clustering.

9. The computer-implemented method of claim 8, further comprising:
classifying and/or clustering the image dataset, by the computing system, in response to a minimum distance algorithm applied across the augmented categories.

10. A computer program embodied on a non-transitory computer-readable medium, the program configured to cause at least one processor to:
initialize atoms $\phi_k$ of a feature dictionary $\Phi$ by imprinting a set of unlabeled patches x;
for each unlabeled patch in x, seek a coefficient vector y such that y is sparse and $\Phi y$ approximates x;
find an approximate solution for y; and
update $\Phi$ using a learning rule.

11. The computer program of claim 10, wherein the program is further configured to cause the at least one processor to find the approximate solution of y using a simple matching pursuit algorithm, orthogonal matching pursuits, an l–1 convex basis pursuit, or a non-convex basis pursuit.

12. The computer program of claim 10, wherein the program is further configured to cause the at least one processor to draw the set of unlabeled patches x for an image dataset.

13. The computer program of claim 12, wherein the learning rule is defined by:

$$\forall \phi_k \in \Phi, \Delta\phi_k = \eta y_k(x - \Phi y)$$

where $\eta$ is a learning rate and k is a number of indexes over $\phi_k$ in $\Phi$.

14. An apparatus, comprising:
memory storing computer program instructions; and
at least one processor configured to execute the computer program instructions, the at least one processor configured to:
learn a sparse overcomplete feature dictionary for an image dataset,
build a local sparse representation of the image dataset using the learned feature dictionary,
apply a local maximum pooling operation on the local sparse representation to produce a translation-tolerant representation of the image dataset, and
classify and/or cluster an object within the translation-tolerant representation of the image dataset using a supervised classification algorithm and/or an unsupervised clustering algorithm.

15. The apparatus of claim 14, wherein the building of the local sparse representation of the image dataset comprises applying a greedy matching pursuit algorithm or a non-convex basis pursuit noisy algorithm.

16. The apparatus of claim 14, wherein the at least one processor is further configured to down-sample the image dataset prior to building the local sparse representation of the image dataset.

17. The apparatus of claim 14, wherein the detecting of the object comprises categorizing the translation-tolerant representation of the image dataset in a predetermined number of categories.

18. The apparatus of claim 17, wherein the at least one processor is further configured to:
learn a number of categories of objects in the image dataset by using supervised and unsupervised clustering of sparse image region representations in the sparse overcomplete feature dictionary; and
classify the image dataset in response to a minimum distance algorithm applied across the learned object categories.

* * * * *